(12) United States Patent
Zhang et al.

(10) Patent No.: US 8,552,384 B2
(45) Date of Patent: Oct. 8, 2013

(54) MIRROR REFLECTION PROCESSING METHOD FOR POSITION SENSITIVE DETECTOR DEVICE

(75) Inventors: Jian Zhang, Shanghai (CN); Guofeng Chen, Shanghai (CN); Xingyan Liu, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 988 days.

(21) Appl. No.: 12/612,275

(22) Filed: Nov. 4, 2009

(65) Prior Publication Data
US 2010/0108892 A1    May 6, 2010

(30) Foreign Application Priority Data
Nov. 5, 2008  (CN) .......................... 2008 1 0202229

(51) Int. Cl.
*G01N 21/00* (2006.01)

(52) U.S. Cl.
USPC ..................................... 250/341.8

(58) Field of Classification Search
USPC ....................................... 250/341.8
See application file for complete search history.

(56) References Cited

U.S. PATENT DOCUMENTS

| | | | |
|---|---|---|---|
| 6,215,116 B1 * | 4/2001 | Van Marcke | 250/221 |
| 2006/0200903 A1 * | 9/2006 | Rodenbeck et al. | 4/623 |

* cited by examiner

*Primary Examiner* — David Porta
*Assistant Examiner* — Shun Lee
(74) *Attorney, Agent, or Firm* — Foley & Lardner LLP

(57) ABSTRACT

A mirror reflection processing method for a position sensitive detector device in intelligent bathroom products. The infrared emitter in the position sensitive detector device is provided with two infrared emitting intensity modes. The position sensitive detector device determines whether to consider that no signal is collected in current collection according to the result of comparison between the reflected infrared signal intensity received by the infrared receiver and the preset value therein, thereby overcoming the mis-operation of the position sensitive detector device when being opposite to objects with relatively high reflectivity, and making the position sensitive detector device even more widely applied.

10 Claims, 1 Drawing Sheet

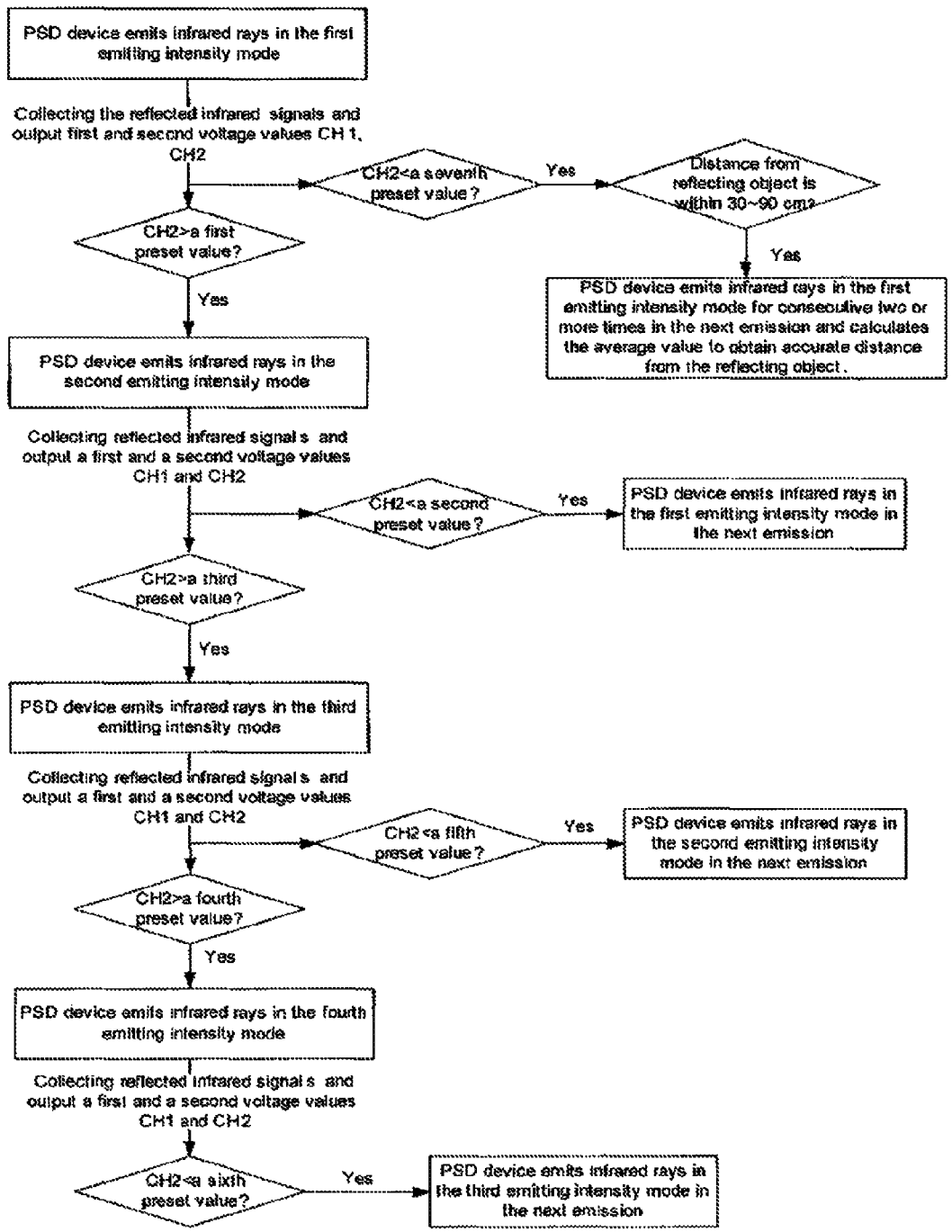

MIRROR REFLECTION PROCESSING METHOD FOR POSITION SENSITIVE DETECTOR DEVICE

FIELD OF THE INVENTION

The present invention relates to a mirror reflection processing method for a position sensitive detector (PSD for short hereinafter) device, and in particular to a mirror reflection processing method for a PSD device applied in the field of intelligent bathroom product.

BACKGROUND OF THE INVENTION

In the field of intelligent bathroom products, infrared sensors have been widely used in many products such as automatic faucet, auto-flushing urinal, flush toilet, toilet seat ejecting warm water, hand dryer and flush toilet with hot air fan.

The infrared sensors used in the conventional intelligent bathroom products employ an active infrared sensing method in which infrared emitters emit infrared rays of a certain wavelength, the infrared rays are reflected by human bodies and then received by infrared receivers to determine the intensity of reflected signals, thereby achieving an automatic detection. However, the automatic detection is difficult to be performed to objects with low infrared reflectivity (such as black clothes and hairs) which only reflect very few of the infrared rays to the infrared receivers. Due to insufficient intensity of the reflected signals, the sensors may fail to detect the presence of the objects, resulting in a detection failure.

In order to solve the above problem of detection failure, a PSD device has been introduced in the automatic bathroom products, wherein a PSD module in the PSD device is a photoelectrical element which is sensitive to the position of incident rays. The PSD device judges whether an object to be detected is within a predetermined range so as to controlling the water flowing and washing operations of the bathroom product. Since the PSD device implements an automatic sensing function by detecting the distance from the object instead of determining the intensity of reflected signal, it is able to overcome the defects that the conventional infrared sensing may encounter i.e. "detection failure due to reflected signals of insufficient intensity".

However, objects which can reflect rays efficiently and have high reflectivity, such as mirror and stainless steel door, are prohibited from being installed opposite to the PSD device, because the PSD device, when receiving the reflected infrared signals with relatively high intensity, may accordingly perform preset operations such as water flowing and washing operations. Therefore, objects with high reflectivity, if located opposite to the PSD device, tend to result in mis-operation of the PSD device.

At present, solutions adopted to solve this problem typically involve preventing objects with high reflectivity being installed opposite to the PSD device, or installing the PSD device obliquely so that rays can not be reflected to the receiver by a vertical object with high reflectivity. The above two solutions, however, limit the application of the sensor, poses more demands to the application environment and limit the mechanical structure of the product.

Accordingly, it is a common concern in the field on how to effectively solve the problem in the PSD device that the PSD device is mis-operated due to the mirror reflection.

SUMMARY OF THE INVENTION

An object of the present invention is to provide a mirror reflection processing method for a PSD device so that the PSD device can operate reliably.

The object of the present invention is achieved by the following solutions.

A mirror reflection processing method for a PSD device, wherein the PSD device comprises an infrared emitter for emitting infrared rays and an infrared receiver for receiving reflected infrared rays. The infrared emitter has four infrared emitting intensity modes sequentially switchable which are first, second, third and fourth infrared emitting intensity modes in a descending order of intensity. The mirror reflection processing method is provided with a mirror interference determination procedure, comprising: calculating a voltage value according to infrared signals received by the infrared receiver so as to indicate an infrared signal intensity of the infrared rays received by the infrared receiver, wherein the voltage value in the fourth infrared emitting intensity mode is calculated. A first fixed value is set and is compared with the voltage value calculated in the fourth infrared emitting intensity mode. Determining that the reflected infrared rays are caused by a mirror interference when the voltage value is greater than the first fixed value. The mirror reflection processing method is provided with a mirror interference processing procedure, comprising considering that no signal is collected by the PSD device when determining the mirror interference.

Furthermore, in the mirror interference determining procedure, there are two voltage values which are calculated from the infrared signals received by the infrared receiver and one of the two voltage values is designated as a designated voltage value for determining.

Furthermore, the mirror interference determining procedure comprises: calculating, in the fourth infrared emitting intensity mode with the lowest intensity, the two voltage values according to the infrared signals received; setting a second fixed value and a first set range so as to determine that the reflected infrared rays are caused by the mirror interference when the difference between the two voltage values is below the second fixed value and the designated voltage value falls within the first set range.

Furthermore, the mirror interference determining procedure comprises: setting a second set range so as to determine that the reflected infrared rays are caused by the mirror interference in the third emitting intensity modes if the designated voltage value which is output according to the received infrared signals exceeds the second set range.

Furthermore, the mirror interference determining procedure comprises: setting a lowest threshold so as to determine that the reflected infrared rays are caused by the mirror interference in any of the infrared emitting intensity modes if the designated voltage value which is output according to the received infrared signals is below the lowest threshold.

Furthermore, in the mirror interference determining procedure, the determining comprises performing a processing of delaying or performing a processing of increasing the number of determinations.

The object of the present invention is achieved by the following solutions.

A mirror reflection processing method for a PSD device, wherein the PSD device comprises an infrared emitter for emitting infrared rays and an infrared receiver for receiving reflected infrared rays. The infrared emitter is provided with at least two infrared emitting intensity modes sequentially switchable. The mirror reflection processing method is provided with a mirror interference determination procedure, comprising: calculating a voltage value according to infrared signals received by the infrared receiver so as to indicate an infrared signal intensity of the infrared rays received by the infrared receiver, wherein the voltage value in the infrared emitting intensity mode with the lowest intensity is calculated. A first fixed value is sent and is compared with the voltage value. Determining that the reflected infrared rays are caused by a mirror interference when the voltage value is greater than the first fixed value. The mirror reflection processing method is provided with a mirror interference processing procedure, comprising considering that no signal is collected by the PSD device when determining the mirror interference.

Furthermore, in the mirror interference determining procedure, there are two voltage values which are calculated from the infrared signals received by the infrared receiver and one of the two voltage values is designated as a designated voltage value for determining.

Furthermore, in the mirror interference determining procedure, the determining comprises performing a processing of delaying or performing a processing of increasing the number of determinations.

The object of the present invention is achieved by two of the following solutions.

A mirror reflection processing method for a PSD device, wherein the PSD device comprises an infrared emitter for emitting infrared rays and an infrared receiver for receiving reflected infrared rays. The infrared emitter is provided with at least two infrared emitting intensity modes sequentially switchable. The mirror reflection processing method is provided with a mirror interference determination procedure, comprising: calculating a voltage value according to infrared signals received by the infrared receiver so as to indicate an infrared signal intensity of the infrared rays received by the infrared receiver, wherein two voltage values in the infrared emitting intensity mode with relatively lower intensity are calculated. A second fixed value and a first set range are set and a difference between the two voltage values is compared with the second fixed value. It is determined that the reflected infrared rays are caused by a mirror interference when the difference is below the second fixed value and the voltage value falls within the voltage range. The mirror reflection processing method is provided with a mirror interference processing procedure, comprising considering that no signal is collected by the PSD device when determining the mirror interference.

Furthermore, in the mirror interference determining procedure, there are two voltage values which are calculated from the infrared signals received by the infrared receiver and one of the two voltage values is designated as a designated voltage value for determining.

Furthermore, in the mirror interference determining procedure, the determining comprises performing a processing of delaying or performing a processing of increasing the number of determinations.

The object of the present invention is achieved by the following solutions.

A mirror reflection processing method for a PSD device, wherein the PSD device comprises an infrared emitter for emitting infrared rays and an infrared receiver for receiving reflected infrared rays. The infrared emitter is provided with at least two infrared emitting intensity modes sequentially switchable. The mirror reflection processing method is provided with a mirror interference determination procedure, comprising: calculating a voltage value according to infrared signals received by the infrared receiver so as to indicate an infrared signal intensity of the infrared rays received by the infrared receiver. A lowest threshold is set and is compared with the voltage value. It is determined that the reflected infrared rays are caused by a mirror interference when the voltage value is lower than the lowest threshold. The mirror reflection processing method is provided with a mirror interference processing procedure, comprising considering that no signal is collected by the PSD device when determining the mirror interference.

Furthermore, in the mirror interference determining procedure, there are two voltage values which are calculated from the infrared signals received by the infrared receiver and one of the two voltage values is designated as a designated voltage value for determining.

Furthermore, in the mirror interference determining procedure, the determining comprises performing a processing of delaying or performing a processing of increasing the number of determinations.

The purpose of the present invention may be achieved by the following technical solutions.

A mirror reflection processing method for a PSD device, wherein the PSD device comprises an infrared emitter for emitting infrared rays and an infrared receiver for receiving reflected infrared rays. The mirror reflection processing method is provided with a mirror interference determination procedure and a mirror interference processing procedure. The mirror interference determination procedure comprises: calculating a voltage value according to infrared signals received by the infrared receiver so as to indicate an infrared signal intensity of the infrared rays received by the infrared receiver; and comparing the calculated voltage value with a preset fixed value or range to judge whether the reflected infrared rays are caused by a mirror interference. The mirror interference processing procedure comprises considering that no signal is collected by the PSD device when determining the mirror interference.

Compared with conventional art, the mirror reflection processing method for a PSD device according to the present invention presets related data which are to be compared with the received reflected signal intensity data, thereby determining, according to the comparison result, which of the reflected signals are caused by the mirror interference. Furthermore, by filtering out the reflected signals determined as the result of mirror interference, the PSD device is provided with advantageous effect of determining the mirror reflection. Thus, the mis-operation of the PSD device when being opposite to objects with relatively high reflectivity can be overcome, thereby the application range of the PSD device is widened.

BRIEF DESCRIPTION OF THE DRAWINGS

The drawing is the flow chart of emitting infrared rays in a plurality of emitting intensity modes according to the present invention.

DETAILED DESCRIPTION OF THE EMBODIMENTS

The PSD device has a PSD module therein which is a photoelectrical element and is sensitive to the position of incident rays. The PSD device includes an infrared emitter and an infrared receiver (i.e., PSD module). Infrared rays emitted from the infrared emitter are blocked by an object and reflected to the infrared receiver, and the reflected rays (incident rays) irradiate on the photo-sensitive surface of the receiver. When the incident rays irradiate on different positions on the photo-sensitive surface, different electrical signals (typically two voltage values, i.e. CH1, CH2) are output. Then, according to the two voltage values, distance between reflecting objects is measured with a triangulation method. Due to the accurate measurement of distance, the PSD device implements an automatic detection for operations of the intelligent bathroom products such as, for example, automatic flushing of the intelligent toilet, automatic flowing of the automatic faucet and drying function of the hand dryer.

In one embodiment, the PSD device for the intelligent bathroom products according to the present invention has four infrared emitting intensity modes which are arranged in the descending order of intensity, namely the first, second, third and fourth intensity modes. In one preferred embodiment of the present invention, the power supply current of the battery is 0.8 A, 0.8 A, 0.2 A and 0.2 A whereas the duration for each infrared emission is 19 μs, 11 μs, 22 μs and 5 μs respectively for the first, second, third and fourth intensity modes. The present invention can save the power consumption through switching among different emitting intensity modes. Of course, the aforementioned numerical values can be changed depending on various applications.

Moreover, the infrared receiver of the PSD device according to the present invention can collect signals at three frequencies i.e. performing one collection every 1 second, 2 seconds and 6 seconds respectively. Switching between these signal collecting frequencies can further reduce the power consumption of the PSD device, which will be described in greater detail later.

Below in combination with specific embodiments, the method for reducing the power consumption of the PSD device in the intelligent bathroom products according to the present invention will be described in detail. In other embodiments, the PSD device which can be applied to the method of the present invention for reducing the power consumption of the PSD device in the intelligent bathroom products can also use other numbers of emitting intensity modes and can also use other parameters such as current value, infrared emitting duration, infrared signal collecting frequency etc. in each mode. The number of the emitting intensity modes and the parameters are not limited to herein, the above PSD device which is merely used as an example and can be varied depending on different situations. For example, there may be 2 emitting intensity modes, 3 emitting intensity modes, 5 emitting intensity modes, 6 emitting intensity modes, 7 emitting intensity modes and so on. The infrared signal may be collected at one frequency or at other different frequencies, for example, signals can be collected every 1 second, 2 seconds, 3 seconds, 4 seconds, 5 seconds, 6 seconds, 7 seconds, 8 seconds, 10 seconds, 12 seconds, 15 seconds and so on. Correspondingly, the duration of the infrared emission may also be different and correspond to respective infrared signal collecting frequencies, and is not limited thereto.

In one embodiment of using the above PSD device to implement the method for reducing power consumption disclosed in the present invention, the infrared emitter of the PSD device in the intelligent bathroom products emits infrared rays in the first intensity mode while the infrared receiver receives the reflected infrared rays. When the second voltage value CH2 in the two output voltage values which are output from the infrared receiver according to the received infrared signal intensity exceeds a first preset value, the emitting intensity mode is switched to the second intensity mode next time when emitting infrared rays. It is noted that the first voltage value CH1 is different from the second voltage value CH2 and it is possible to select either one voltage value from them for determining. The following description of embodiments adopts the second voltage value CH2 in the explanation for the descriptive convenience only. Alternatively, it is acceptable to employ the first voltage value CH1. The corresponding preset value is set according to corresponding voltage value. In the present invention, the first preset value preferably falls within a range from 1000 mV to 2500 mV. In another preferable embodiment, the first preset value is 1100 mV.

When the infrared emitter emits infrared rays in the second intensity mode, if the CH2 value among the voltage values which are output from the infrared receiver in accordance with the received reflected infrared signal intensity is below a second preset value, then the emitting intensity mode is switched to the first intensity mode in the next emission. In the present invention, the second preset value preferably falls within a range from 300 mV to 700 mV. In another preferable embodiment, the second preset value is 500 mV. If, on the other hand, the CH2 value among the output voltage values is above a third preset value, then the emitting intensity mode is switched to the third intensity mode in the next emission. In a preferred embodiment of the present invention, the third preset value is 1970 mV.

A fifth preset value is set so that, when the infrared emitter emits infrared rays in the third intensity mode and if the CH2 value in the voltage values which are output from the infrared receiver in accordance with the received reflected infrared signal intensity is below the fifth preset value, the emitting intensity mode is switched to the second intensity mode in the next emission. A fourth preset value is set so that, if the CH2 value in the output voltage values is above the fourth preset value, the emitting mode is switched to the fourth emitting intensity mode in the next emission. In another preferred embodiment of the present invention, the fourth preset value is equal to the third preset value.

A sixth preset value is set so that, when the infrared emitter emits infrared rays in the fourth intensity mode and if the CH2 value in the voltage values which are output by the infrared receiver in accordance with the received reflected infrared signal intensity is below the sixth preset value, the emitting mode is switched to the third intensity mode in the next emission.

As described above, in case of an object with high reflectivity, the collected signal value is above a preset value, for example, the signal value is above the third preset value and the feedback of the first signal emission is the signal of high reflectivity. Accordingly, the emitting current is reduced to save power consumption i.e., adopting low intensity emission. In case of an object with low reflectivity, when the collected signal value is below a preset value, for example, the signal value is below the first preset value, the feedback of the first signal emission is a signal with low reflectivity. Accordingly, signals are still emitted with high emitting current and the emitting frequency is raised to the high intensity emitting mode. Since the power consumption varies with the different emitting intensity modes, switching between different emitting intensity modes can reduce the power consumption of the PSD device.

In other embodiments, the aforementioned preset standard values namely 500 mV, 1100 mV and 1970 mV may be set depending on specific situations. In particular, according to different embodiments, these values may be 200 mV, 300 mV, 400 mV, 600 mV, 700 mV, 800 mV, 900 mV, 1000 mV, 1200 mV, 1300 mV, 1400 mV, 1500 mV, 1600 mV, 1700 mV, 1800 mV, 2000 mV, 2100 mV, 2200 mV, 2300 mV, 2400 mV, 2500 mV and so on.

Moreover, in order to further reduce the power consumption of the PSD device, signal collecting frequencies of the infrared receiver of the PSD device in an idle state when nobody uses the intelligent bathroom product containing the PSD device may be different from those in a busy state when somebody uses the intelligent bathroom product containing the PSD device. For example, the frequencies can be so configured as to collect signals every 1 second in the busy state but every 2 seconds in the idle state. Moreover, after the idle state remains unchanged for a certain period such as 1 hour, the PSD device may enter a suspend state in which the signal are collected at a frequency such as every 6 seconds. In other embodiments, the period may be altered according to different circumstances and is not limited hereto.

In one embodiment, the idle state when nobody uses the intelligent bathroom product containing the PSD device can be determined as follows. The PSD device has a preset value. In practice, the PSD device outputs two voltage values CH1 and CH2 according to the reflected infrared signal received at the receiver to calculate an actual distance value. By comparing the actual distance value with the preset distance value, the presence information of anybody can be obtained. The PSD device may collect signals every 2 seconds in the idle state but enter a state of collecting signals every 1 second when determining the presence information of somebody. After the idle state remains unchanged for a certain period such as 0.5 hour, 1 hour or 2 hours, the infrared collecting interval may be prolonged to about 6 seconds. In addition, which emitting intensity mode is to be employed depends on the received signal intensity. Further, whether the infrared emitting interval corresponds to the signal collecting interval can be configured according to different circumstances, and is not limited hereto.

Further, when the PSD device determines that the obtained distance value satisfies the condition of the presence of anybody, the signal is collected every one second. If the obtained distance values satisfies with the condition of the presence of anybody for consecutive n times (the specific value of n may depend on practical conditions according to different embodiments), a detecting state is entered. Further, after entering the detecting state, if the obtained distance values fail to satisfy with the condition of the presence of anybody for consecutive n times, the detecting state is ended. For different intelligent bathroom products such as automatic faucet, auto-flushing urinal and so on, operations under the state of the presence of anybody may include front sprinkling, front flushing, back sprinkling, back flushing and so on.

Further, in order to increase the detection accuracy for objects with low reflectivity, another embodiment of the present invention provides a method in which a plurality of collected signals are averaged.

In one embodiment, in the infrared emitting mode with the highest intensity, only when the collected infrared signal has a relatively low intensity which is below a seventh preset value, the distance of the reflecting object is calculated according to the two output voltage values. Preferably, the seventh preset value is within a range from 200 mV to 700 mV. In another preferred embodiment, the seventh preset value is 500 mV.

Further, if it is calculated that the position and distance of the reflecting object is within the preset range such as 30-90 cm according to the two output voltage values, the PSD device may adopt a method, in which a plurality of emissions are performed and collected signals are averaged, in the next emission to detect the distance from the reflecting object. Thus, the determination accuracy may be considerably improved.

In a preferred embodiment of the present invention, the fifth, sixth and seventh preset values are the same as the second preset value.

Accordingly, the initiation of the solution with a plurality of collections is caused by two conditions, namely, signal intensity and distance value, thereby avoiding using the solution with a plurality of collections in the case that the reflecting object is too near or too distant away. In this way, not only the collection accuracy is ensured but also the power consumption is appropriately saved.

As stated above, the embodiment of intensity mode switching and the embodiment of averaging in a plurality of consecutive emissions are combined, as illustrated in FIG. 1.

As mentioned above, the power saving method disclosed in the present invention is not necessarily limited to four emitting intensity modes. In another preferred embodiment, only two emitting intensity modes, namely, the first and second infrared emitting intensity modes with high and low intensity respectively, are used. With reference to the above embodiment provided with four modes, the first and second preset values, the seventh preset value and distance preset value are set. In the first infrared emitting intensity mode, if the obtained voltage value CH2 is above the first preset value, then the infrared rays are emitted in the second emitting intensity mode. If, in the second emitting intensity mode, the obtained voltage value CH2 is below the second preset value, then the infrared rays are emitted in the first emitting intensity mode. If, in the first infrared emitting intensity mode, the voltage value CH2 is below the seventh preset value, then a method in which at least two emissions are used is employed according to a determined distance. The detailed implementation thereof may be referred to the above described four emitting intensity modes and will not be repeated.

Similarly, it is possible to set three infrared emitting intensity modes or other kinds of infrared emitting intensity modes.

In particular, the above disclosed PSD device which has two infrared emitting intensity modes, four infrared emitting intensity modes or other numbers of infrared emitting intensity modes can be used to determine a mirror reflection. It is known that, the mirror reflection of objects with high emitting intensity, such as mirror and stainless steel door, is different from the diffuse reflection. Particularly, the mirror reflection may result in significant difference between the magnitudes of the two signals (i.e., between the first and second voltage values CH1 and CH2), or received signals exceeding the limit when emitting infrared rays with fixed intensity. A detail description is given below.

The mirror reflection processing method of the present invention includes a mirror interference determination procedure and a mirror interference processing procedure. Disclosed below are several embodiments of the mirror reflection processing method.

As an example, the PSD device operates in the four infrared emitting intensity modes. The infrared emitting intensity modes are switched sequentially from high to low in the descending order of intensity. In the case that the mode has already been switched to the fourth infrared emitting intensity mode with the lowest intensity, if the reflected signal received by the infrared receiver still has a high intensity which exceeds the first fixed value, then the presence of mirror (or stainless steel door and so on) is determined and the reflected signal received by the infrared receiver is also determined as a mirror interference. The above is the mirror interference determination procedure, whereas the mirror interference processing procedure is as follows. When the mirror interference is determined, it is considered that no signal is received by the PSD device and no operation is performed to the valves of the bathroom product (such as automatic faucet and an auto-flushing urinal) or the operation for the valves of the bathroom product is not performed for a period. In a preferred embodiment of the present invention, the first fixed value is 1800 mV. Alternatively, in other embodiments, the first fixed value may also be 1900 mV, 2000 mV, 2100 mV, 2200 mV, etc. As another preferred embodiment, the first fixed value is greater than 1800 mV.

It is noted that, the ranges of preset values or fixed values described above or to be described later may changed depending on various application environments and hardware settings. As described above, the voltage values indicating the reflected infrared signal intensity are the two voltage values output by the infrared receiver of the PSD device after receiving the reflected infrared signal. One of the two voltage values (CH1 and CH2) is to be compared with the above described first fixed value. Throughout the description below, the second voltage value CH2 is employed to be compared with the above described first fixed value. Of course, it is acceptable to employ the first voltage value CH1 for comparing. Even using the first voltage value CH1 or using the second voltage value CH2 will cause variations of the range of the above preset values or fixed values, the solution in which the first voltage value CH1 is used is equivalent to the solution in which the second voltage value CH2 is used, and both solutions will fall within the scope of the present invention.

Further, in the fourth infrared emitting intensity mode with the lowest intensity, if the difference between two voltage values CH1 and CH2 which are output according to the reflected infrared signal received by the infrared receiver is below a second fixed value and the second voltage value CH2 falls within a first preset range, then the presence of objects with high reflectivity such as mirror (or stainless steel door) is determined. The above provides the mirror interference determination procedure, whereas the mirror interference processing procedure is as follows. When the mirror interference is determined, it is considered that no signal is collected by the PSD device and no operation is performed to the valves of the bathroom product or no operation is performed to the valves of the bathroom product for a period. In a preferred embodiment of the present invention, the first preset range is from 100 mV to 400 mV, whereas the second fixed value may be 600 mV, 550 mV, 500 mV, 450 mV, 400 mV and so on in different embodiments, which will not be repeated herein.

Further, in the third infrared emitting intensity mode (or in the infrared emitting mode with relatively low intensity), if the second voltage value CH2 of the infrared signal received by the infrared receiver exceeds the second preset range, then the presence of objects with high reflectivity such as mirror (or stainless steel door) is determined. The above provides the mirror interference determination procedure, whereas the mirror interference processing procedure is as follows. When the mirror interference is determined, it is considered that no signal is collected by the PSD device and no operation is performed to the valves of the bathroom product or no operation is performed to the valves of the bathroom product for a period. In a preferred embodiment of the present invention, the second preset range is from 140 mV to 760 mV.

Further, in any emitting intensity mode, if the second voltage value CH2 of the infrared signal received by the infrared receiver is lower than a lowest threshold, then the presence of objects with high reflectivity such as mirror (or stainless steel door) in the front is determined. The above provides the mirror interference determination procedure, whereas the mirror interference processing procedure is as follows. When the mirror interference is determined, it is considered that no signal is collected by the PSD device. The lowest threshold may specifically be 150 mV, 120 mV, 90 mV, 60 mV, and so on according to different embodiments, which will not be repeated herein. The reason for causing the low second voltage value CH2 may lie in that, the objects with high reflectivity such as mirror (or stainless steel door) are not immediately face to the PSD device and reflect the infrared rays elsewhere, or it may also lie in that the PSD device is very distant away from the reflecting objects in the front. Herein, it is believed that the objects with high reflectivity such as mirror (or stainless steel door) occur in the front, thus it is considered that no signal is collected by the PSD device and no operation is performed to the valves of the bathroom product or no operation is performed to the valves of the bathroom product for a period.

As for above conditions in which it is considered that no signal is collected by the PSD device, if these conditions occur alternatively, it may indicate the presence of rotating or detachable door or mirror in the opposite. In order to avoid mis-operation and improve system reliability, the PSD device may perform a processing of delaying or a processing of increasing times for the determination.

In the above description, the method using four infrared emitting intensity modes serves as merely an example. Of course it is also possible to use two or other numbers of infrared emitting intensity modes. Generally, in the mirror reflection processing method for PSD device of the present invention, the infrared emitter is provided with at least two infrared emitting intensity modes. The following description is given by the example of two infrared emitting intensity modes, i.e. the first and second infrared emitting intensity modes (it is assumed that the intensity of the first infrared emitting intensity mode is higher than that of the second infrared emitting intensity mode).

The infrared emitting intensity modes are switched sequentially in the descending order of intensity, i.e. from high to low. As to the infrared rays emitted in the second infrared emitting intensity mode with lower intensity, if the second voltage value of the reflected infrared signal intensity is above a fixed value, then the presence of objects with high reflectivity such as mirror (or stainless steel door) is determined and it is considered that no signal is collected by the PSD device.

Alternatively, if the difference between the two output voltage values is below another fixed value and the output second voltage value is within a certain range, then the presence of objects with high reflectivity such as mirror (or stainless steel door) is determined and it is considered that no signal is collected by the PSD device.

Further, in any emitting intensity mode, if the second voltage value CH2 of the infrared signal received by the infrared receiver is lower than a lowest threshold, then the presence of objects with high reflectivity such as mirror (or stainless steel door) is determined. Thus, it is considered that no signal is collected by the PSD device and no operation is performed to the valves of the bathroom product or no operation is performed to the valves of the bathroom product for a period.

As for above conditions in which it is considered that no signal is collected by the PSD device, if these conditions occur alternatively, it may indicate the presence of rotating or detachable door or mirror in the opposite. In order to avoid mis-operation and improve system reliability, the PSD device may perform a processing of delaying or a processing of increasing times for the determination.

In addition, in whatever number of modes, including either two infrared emitting intensity modes or four infrared emitting intensity modes or other numbers of infrared emitting intensity modes, and in whatever level of emitting intensity modes, if the PSD device receives the reflected infrared signal intensity which remains the same for consecutive times, then it is considered that no signal is collected by the PSD device.

The number of the consecutive times may be 2 times, 3 times, 5 times, 8 times, 10 times, 15 times and so on according to different embodiments.

Of course, the mirror reflection processing method of the present invention may also employ a single infrared emitting intensity mode. In the single infrared emitting intensity mode, if the voltage value of the infrared signal received by the infrared receiver exceeds a fixed value, then the presence of objects with high reflectivity such as mirror (or stainless steel door) is determined and it is determined that the mirror interference of the object exists. Thus, it is considered that no signal is collected by the PSD device and no operation is performed to the valves of the bathroom product or no operation is performed to the valves of the bathroom product for a period. Alternatively, in the single infrared emitting intensity mode, if the difference between two voltage values output by the infrared receiver according to the reflected infrared signal received by the infrared receiver is below a second fixed value and the second voltage value CH2 falls within a preset range, then the presence of objects with high reflectivity such as mirror (or stainless steel door) is determined. All above described methods for determining mirror interference in two, four or other numbers of infrared emitting intensity modes are also applicable to the single infrared emitting intensity mode.

Compared with conventional art, the mirror reflection processing method for the PSD device according to the present invention presets related data which are then compared with the received reflected signal intensity data, thereby determining, according to a comparison result, which of the reflected signals are caused by the mirror interference. Furthermore, by filtering out the reflected signals determined as the result of mirror interference, the PSD device is provided with advantageous effect of determining the mirror reflection. Thus, the mis-operation of the PSD device when being opposite to objects with relatively high reflectivity can be overcome, thereby the application range of the PSD device is widened.

Though the present invention is described above with preferred embodiments, it is not limited to those embodiments. It is noted that all modifications, equivalent replacements and improvements made within the spirit and principle of the present invention shall fall into the protect scope of the present invention.

What is claimed is:

1. A mirror reflection processing method for a position sensitive detector device, wherein the position sensitive detector device comprises an infrared emitter for emitting infrared rays and an infrared receiver for receiving reflected infrared rays, wherein the infrared emitter has four infrared emitting intensity modes sequentially switchable which are first, second, third and fourth infrared emitting intensity modes in a descending order of intensity, and the mirror reflection processing method is provided with a mirror interference determination procedure, comprising:

calculating a designated voltage value according to infrared signals received by the infrared receiver so as to indicate an infrared signal intensity of the infrared rays received by the infrared receiver, wherein the voltage value in the fourth infrared emitting intensity mode is calculated; and setting a first fixed value and comparing the voltage value calculated in the fourth infrared emitting intensity mode with the first fixed value, and determining that the reflected infrared rays are caused by a mirror interference when the voltage value is greater than the first fixed value;

wherein in the mirror interference determination procedure, there are two voltage values which are calculated from the infrared signals received by the infrared receiver and one of the two voltage values is said designated voltage value;

calculating, in the fourth infrared emitting intensity mode with the lowest intensity, the two voltage values according to the infrared signals received; and setting a second fixed value and a first set range so as to determine that the reflected infrared rays are caused by the mirror interference when the difference between the two voltage values is below the second fixed value and the designated voltage value falls within the first set range, wherein the mirror interference processing procedure further comprises considering that no signal was collected by the position sensitive detector device in response to the determination of the mirror interference.

2. The mirror reflection processing method for the position sensitive detector device according to claim 1, wherein the mirror interference determination procedure comprises:

setting a lowest threshold so as to determine that the reflected infrared rays are caused by the mirror interference in any of the infrared emitting intensity modes if the designated voltage value which is output according to the received infrared signals is below the lowest threshold.

3. The mirror reflection processing method for the position sensitive detector device according to claim 1, wherein in the mirror interference determination procedure, the determining comprises performing a processing of delaying or performing a processing of increasing the number of determinations.

4. A mirror reflection processing method for a position sensitive detector device, wherein the position sensitive detector device comprises an infrared emitter for emitting infrared rays and an infrared receiver for receiving reflected infrared rays, wherein the infrared emitter has four infrared emitting intensity modes sequentially switchable which are first, second, third and fourth infrared emitting intensity modes in a descending order of intensity, and the mirror reflection processing method is provided with a mirror interference determination procedure, comprising:

calculating a designated voltage value according to infrared signals received by the infrared receiver so as to indicate an infrared signal intensity of the infrared rays received by the infrared receiver, wherein the voltage value in the fourth infrared emitting intensity mode is calculated;

setting a first fixed value and comparing the voltage value calculated in the fourth infrared emitting intensity mode with the first fixed value, and determining that the reflected infrared rays are caused by a mirror interference when the voltage value is greater than the first fixed value; and setting a second set range so as to determine that the reflected infrared rays are caused by the mirror interference in the third emitting intensity modes if the designated voltage value which is output according to the received infrared signals exceeds the second set range, wherein in the mirror interference determination procedure, there are two voltage values which are calculated from the infrared signals received by the infrared receiver and one of the two voltage values is said designated voltage value, and wherein the mirror reflection processing method is provided with a mirror interference processing procedure, comprising considering that no signal is collected by the position sensitive detector device when determining the mirror interference.

5. The mirror reflection processing method for the position sensitive detector device according to claim 4, wherein the mirror interference determination procedure comprises:
setting a lowest threshold so as to determine that the reflected infrared rays are caused by the mirror interference in any of the infrared emitting intensity modes if the designated voltage value which is output according to the received infrared signals is below the lowest threshold.

6. The mirror reflection processing method for the position sensitive detector device according to claim 4, wherein the mirror interference determination procedure includes delaying a determination or increasing the number of determinations.

7. The mirror reflection processing method for the position sensitive detector device according to claim 4, wherein considering that no signal is collected includes disregarding or ignoring the signal received by the infrared receiver.

8. A mirror reflection processing method for a position sensitive detector device, wherein the position sensitive detector device comprises an infrared emitter for emitting infrared rays and an infrared receiver for receiving reflected infrared rays, wherein:
the infrared emitter is provided with at least two infrared emitting intensity modes sequentially switchable; and
the mirror reflection processing method is provided with a mirror interference determination procedure, comprising:
calculating a designated voltage value according to infrared signals received by the infrared receiver so as to indicate an infrared signal intensity of the infrared rays received by the infrared receiver, wherein two voltage values in the infrared emitting intensity mode with relatively lower intensity are calculated; and
setting a second fixed value and a first set range and comparing a difference between the two voltage values with the second fixed value and determining that the reflected infrared rays are caused by a mirror interference when the difference is below the second fixed value and the designated voltage value falls within the first set range;
wherein the mirror reflection processing method is provided with a mirror interference processing procedure, comprising considering that no signal is collected by the position sensitive detector device when determining that the mirror interference exists.

9. The mirror reflection processing method for the position sensitive detector device according to claim 8, wherein: in the mirror interference determination procedure, there are two voltage values which are calculated from the infrared signals received by the infrared receiver and one of the two voltage values is said designated voltage value.

10. The mirror reflection processing method for the position sensitive detector device according to claim 8, wherein, in the mirror interference determination procedure, the determining comprises performing a processing of delaying or performing a processing of increasing the number of determinations.

* * * * *